United States Patent [19]

Billmyre

[11] Patent Number: 5,037,545
[45] Date of Patent: Aug. 6, 1991

[54] LIQUID RECOVERY SYSTEM AND METHOD

[76] Inventor: Richard D. Billmyre, 4822 Fauna La., Indianapolis, Ind. 46234

[21] Appl. No.: 557,319

[22] Filed: Jul. 23, 1990

Related U.S. Application Data

[62] Division of Ser. No. 422,533, Oct. 17, 1989, Pat. No. 4,960,515, which is a division of Ser. No. 315,809, Feb. 27, 1989, Pat. No. 4,894,170.

[51] Int. Cl.$^5$ ............................................. B01D 17/035
[52] U.S. Cl. ..................................... 210/209; 34/168; 34/227; 34/235
[58] Field of Search ...................... 210/416.1, 170, 435, 210/198.1, 209, 212, 218, 195.1; 209/11; 34/165, 168, 172, 170, 201, 210, 218, 227, 235

[56] References Cited

U.S. PATENT DOCUMENTS

| | | | |
|---|---|---|---|
| 1,450,216 | 4/1923 | Marsh et al. | |
| 2,078,088 | 4/1937 | Mantius et al. | 23/172 |
| 2,322,134 | 6/1943 | Hodge | 23/126 |
| 2,484,799 | 10/1949 | Swindin | 23/295 |
| 2,960,391 | 11/1960 | Sweet et al. | 23/296 |
| 3,447,684 | 6/1969 | Morrison | 210/108 |
| 3,900,955 | 8/1975 | Peterson | 23/273 R |
| 3,936,316 | 2/1976 | Gulla | 134/3 |
| 4,200,612 | 4/1980 | Lamaze | 210/683 |
| 4,222,997 | 9/1980 | Beecher | 423/481 |
| 4,250,034 | 2/1981 | Wolters | 210/416.1 |
| 4,255,407 | 4/1981 | Puutumen | 423/DIG. 1 |
| 4,488,958 | 12/1984 | Williams et al. | 209/11 |
| 4,565,675 | 1/1986 | Uchino et al. | 423/140 |

*Primary Examiner*—Frank Sever
*Attorney, Agent, or Firm*—Willian Brinks Olds Hofer Gilson & Lione

[57] ABSTRACT

A liquid recovery system and method for precipitating dissolved solid material out of a spent liquid, and for thereafter separating the precipitated solid material from the liquid to provide a recovered liquid. The system includes a first tank for receiving spent liquid in a substantially continuous manner, a second tank for receiving a quantity of spent liquid from the first tank, a separator for separating solid material from the spent liquid in the second tank to provide a recovered liquid in the second tank, a third tank for receiving a quantity of recovered liquid from the second tank, and output means for delivering recovered liquid from the third tank in a continuous manner. The separator includes a separator tank through which spent liquid in the second tank is circulated during a circulation period to separate precipitated solid material from the spent liquid. The separator includes means for cleaning and drying separated solid material accumulated therein to permit the accumulated solid material to be dispensed therefrom by gravity into a storage container or the like. The system and method provides advantages of both continuous-type and batch-type liquid recovery systems and methods without their inherent disadvantages.

4 Claims, 2 Drawing Sheets

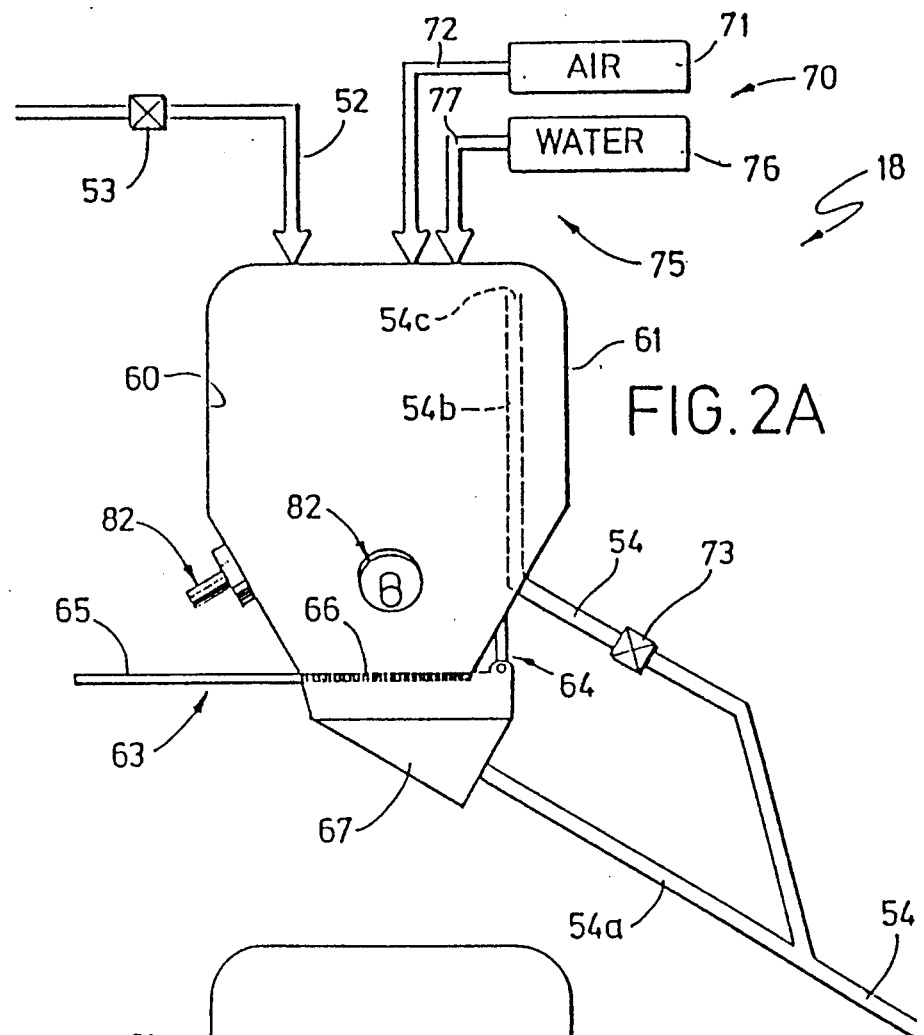
FIG.2A
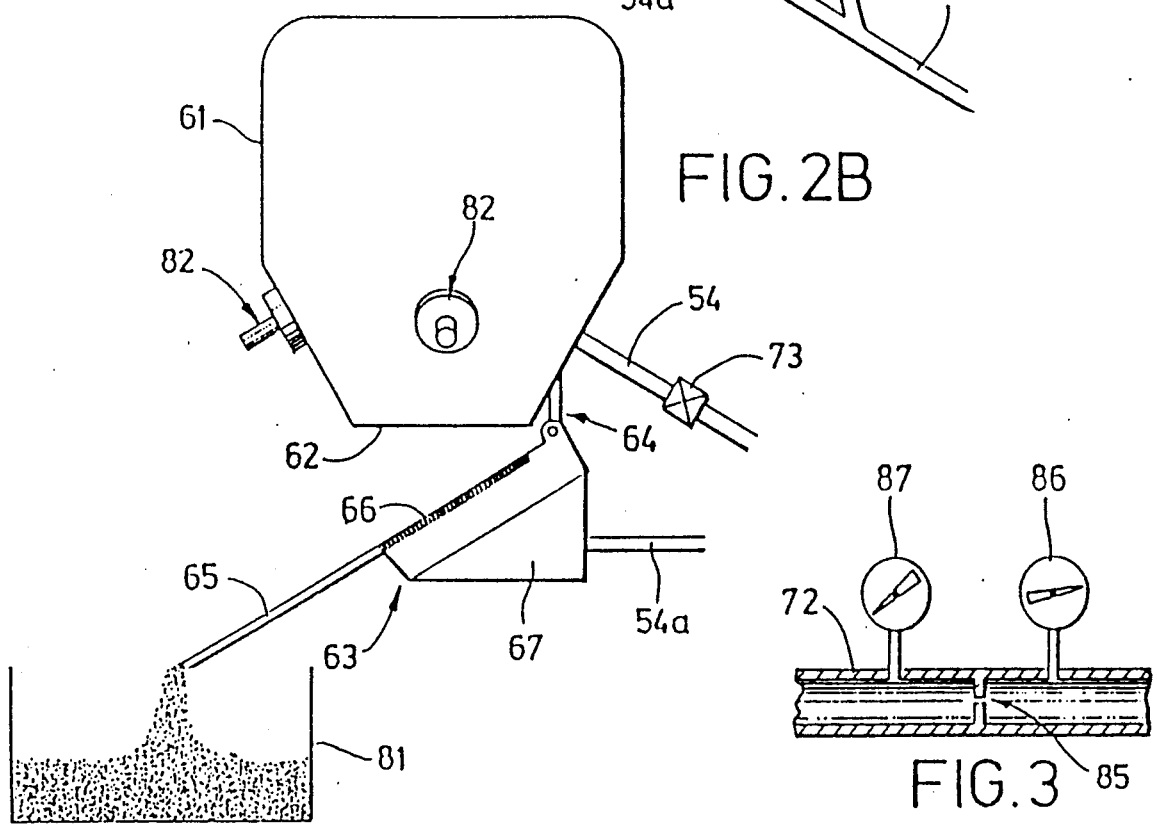
FIG.2B
FIG.3

LIQUID RECOVERY SYSTEM AND METHOD

This application is a division of application Ser. No. 07/422,533, filed Oct. 17, 1989, now U.S. Pat. No. 4,960,515 which, in turn, is a division of application Ser. No. 07/315,809, dated Feb. 27, 1989, now U.S. Pat. No. 4,894,170.

BACKGROUND OF THE INVENTION

The present invention relates generally to a liquid recovery system and method; and, more particularly, to a system and method for separating dissolved solid material from a liquid.

Pickling iron and steel to remove rust and scale is typically accomplished by using an aqueous sulfuric acid solution. The pickling process produces dissolved impurities, primarily ferrous sulfates, in the solution; and when the concentration of the dissolved impurities approaches a saturation level in the solution, the solution becomes ineffective and must be either disposed of or recovered by removal of the impurities.

Various processes are known for recovering spent pickling acid. Generally, these prior processes involve cooling the spent acid to cause the ferrous sulfate to crystallize out of the acid; and, thereafter, physically separating the precipitated crystals from the acid. Known processes include batch-type and continuous-type processes. In a batch-type process, a quantity of spent pickling acid is removed from a pickling tank and processed to separate the ferrous sulfate from the acid; and the recovered acid is then returned to the pickling tank for reuse. In a continuous-type process, spent pickling acid is withdrawn from the pickling tank in a continuous manner and caused to travel through an extended path along which the acid is gradually purified; and the recovered acid is then continuously returned to the pickling tank.

Neither batch-type nor continuous-type acid recovery processes known in the art are fully satisfactory. Batch-type processes often required interruption of a pickling operation while the spent acid was being recovered, and were generally not conducive to a high degree of automation. Continuous-type processes usually required large structures which occupied substantial space, and were generally not as effective as batch-type processes in removing substantially all impurities from the spent acid before it was returned to the pickling tank.

After being separated from the spent acid, the ferrous sulfate crystals are in the form of a thick, crystal slurry; and most acid recovery systems include structure for periodically removing the accumulated crystal slurry from the system. In most systems, the crystal removing structure comprised a rotating auger, basket or other movable component to push the crystal slurry out of the system, or pumping structure to pump the slurry out of the system.

Prior removing structures are also not fully satisfactory. For one thing, the slurry tends to adhere to internal surfaces of the system; and prior removing structures were often unable to fully remove the slurry. Also, prior removing structures often became clogged by the slurry and required frequent cleaning and maintenance for proper operation.

SUMMARY OF THE INVENTION

The present invention relates to a system and method for precipitating dissolved solid material out of a liquid (generally referred to herein as a "spent liquid"), and for thereafter separating the precipitated solid material from the liquid to provide a "recovered liquid". The system according to the invention includes a first tank, input means for delivering spent liquid to the first tank in a substantially continuous manner, a second tank, first fluid coupling means for transferring a quantity of spent liquid from the first tank to the second tank, a separator for separating solid material from the spent liquid in the second tank to provide recovered liquid in the second tank, a third tank, second fluid coupling means for transferring a quantity of recovered liquid from the second tank to the third tank, and output means for delivering recovered liquid out of the third tank in a substantially continuous manner.

With the system of the present invention, spent liquid is delivered to the system in a substantially continuous manner and recovered liquid is delivered out of the system in a substantially continuous manner permitting spent liquid to be received from and recovered liquid to be returned to a utilization means in an efficient, continuous manner as is characteristic of continuous-type recovery systems. Within the system, however, the liquid is handled in a batch-type manner thus providing efficient and more effective recovery of the liquid as is characteristic of batch-type recovery systems. The system of the invention thus provides advantages of both the continuous-type and batch-type liquid recovery processes without their inherent disadvantages.

In accordance with a presently preferred embodiment, the system includes first cooling means for reducing the temperature of the spent liquid in the first tank from a first temperature to a second temperature; and second cooling means for reducing the temperature of the spent liquid in the second tank from the second temperature through a third temperature at which dissolved solid material begins to precipitate out of the liquid, down to a fourth temperature at which substantially all dissolved solid material has precipitated out of the liquid. The separator comprises a separator tank connected to the second tank to permit liquid in the second tank to be circulated through the separator tank during a circulation period which begins approximately when the temperature of the spent liquid in the second tank reaches the third temperature and ends approximately when the temperature of the liquid in the second tank reaches the fourth temperature. During the circulation period, liquid in the second tank circulates through the separator tank and back to the second tank. As the liquid passes through the separator tank, precipitated solid material therein separates from the liquid by gravity and accumulates on the bottom of the separator tank. When the temperature of the liquid in the second tank reaches the fourth temperature, substantially all of the dissolved solid material in the liquid will have precipitated out of the liquid and have been accumulated in the separator tank. At that time, the circulation period is terminated; and the liquid contained in the second tank will be recovered liquid substantially free of impurities. The recovered liquid in the second tank is then transferred to the third tank to permit a new quantity of spent liquid to be transferred from the first tank to the second tank to be recovered in the next cycle of operation of the system.

In accordance with a further aspect of the invention, the separator includes means for removing accumulated solid material therefrom that does not require the use of rotating augers or baskets or pumping structure as are typically employed in prior recovery systems. In particular, the separator tank includes an outlet opening adjacent the bottom end thereof, and a closure member movable between a first, closed position covering the opening and a second, open position uncovering the opening.

During a circulation period, the closure member is in the first, closed position such that the precipitated solid material accumulates thereon. At the end of a circulation period, the closure member is moved to its second, open position uncovering the outlet opening such that the accumulated solid material may be dispensed from the separator tank by gravity through the outlet opening.

In accordance with yet a further aspect of the invention, the separator also includes means for washing and drying the accumulated solid material prior to its being dispensed from the separator tank. In particular, in many applications, the accumulated solid material is in the form of a thick slurry which is messy and difficult to handle. By cleaning and drying the solid material prior to its removal, however, the solid material flows smoothly and easily by gravity through the outlet opening of the separator tank, and can be collected in a suitable container for future use or disposal.

The drying means of the invention comprises means for coupling the separator tank to a source of pressurized gas; and means for causing the pressurized gas to escape from the separator tank through the accumulated solid material so as to drive any liquid adhering to the solid material out of the separator tank. The cleaning means includes means for spraying water or another suitable cleaning agent or chemical over the accumulated solid material in the separator tank.

In accordance with another aspect of the invention, monitoring means are connected to the drying means for indicating when the solid material in the separator tank has been sufficiently dried for removal. The monitoring means comprises a small orifice in the line coupling the pressurized gas source to the separator tank, and pressure monitoring means for monitoring the pressure in the line on opposite sides of the orifice and the difference in pressure therebetween. When the pressure difference reaches a predetermined value, the solid material in the separator tank has been sufficiently dried for removal.

In general, the system and method of the present invention enables solid material to be precipitated out of and then separated from a spent liquid in an efficient, substantially fully automated manner. The system is particularly designed for use as an acid recovery system for recovering spent pickling acid, but can be used in numerous applications wherein it is desired to separate dissolved solid material from a liquid.

Further advantages and specific details of the invention will become apparent hereinafter in conjunction with the following detailed description of a presently preferred embodiment.

BRIEF DESCRIPTION OF THE DRAWINGS

FIG. 2A schematically illustrates the separator in the system of FIG. 1;

FIG. 2B schematically illustrates the separator of FIGS. 1 and 2A with the closure member thereof in an open, solid material dispensing position; and FIG. 3 schematically illustrates an important feature of the separator of FIGS. 1, 2A and 2B.

DETAILED DESCRIPTION OF THE PREFERRED EMBODIMENT

Figure 1:
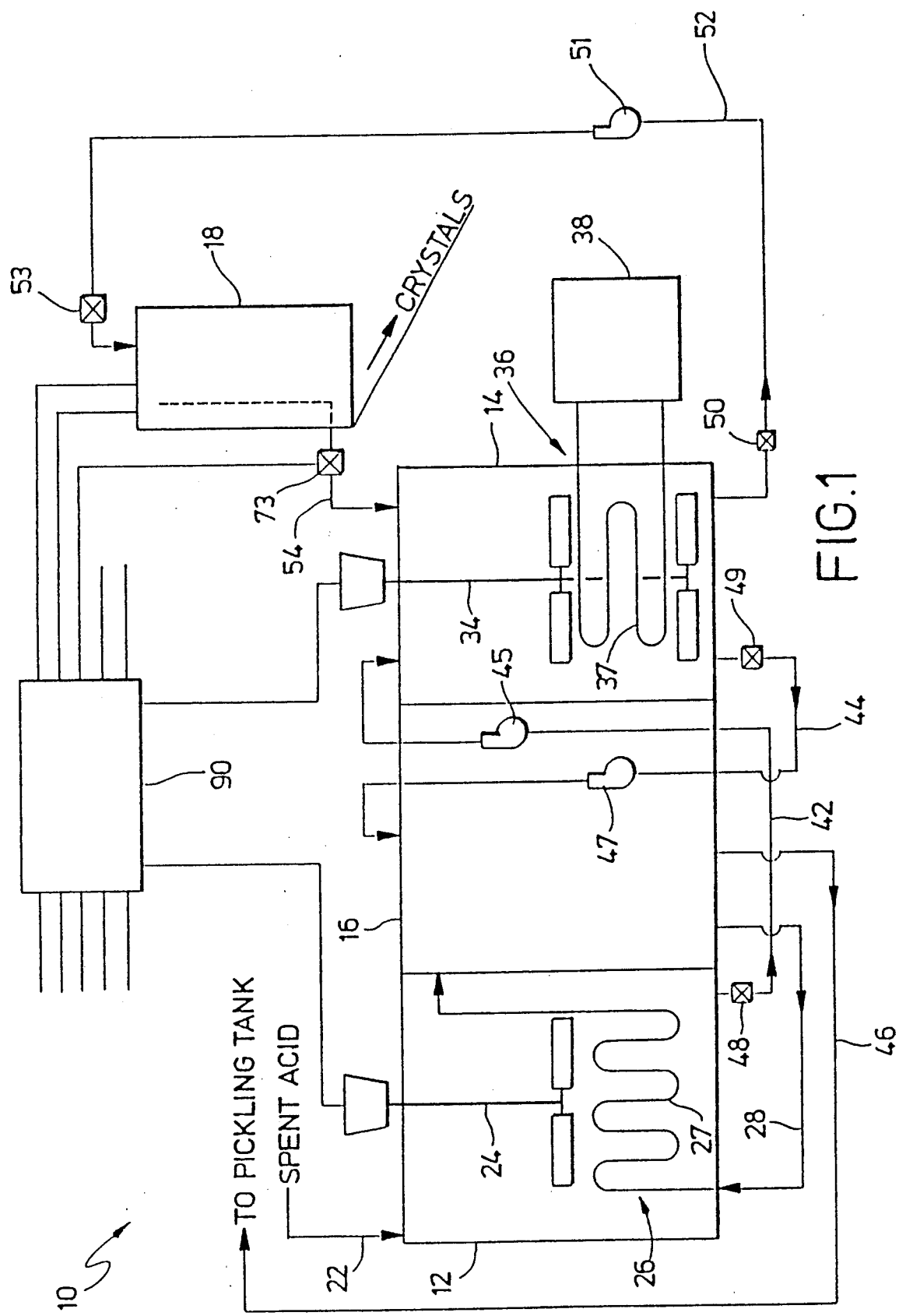
FIG. 1 schematically illustrates a liquid recovery system according to a presently preferred embodiment of the invention.

FIG. 1 schematically illustrates a liquid recovery system according to a presently preferred embodiment of the invention. The system, is generally designated by reference number 10, and is described herein as an acid recovery system for recovering spent pickling acid used to remove rust and scale from iron and steel. It is to be understood, however, that the liquid recovery system of the present invention can be used in numerous applications wherein it is desired to separate dissolved solid material from a liquid; and it is not intended to limit the invention to any particular application.

System 10 includes a first, spent acid receiving tank 12 for receiving spent pickling acid from a pickling tank or other spent acid source (not shown), a second, acid recovery tank 14 for precipitating ferrous sulfate crystals out of the spent acid, a third, recovered acid storage tank 16 for storing recovered acid and for supplying recovered acid to a pickling tank or other recovered acid receiving means, and a separator 18 for separating precipitated ferrous sulfate crystals from the acid.

First, spent acid receiving tank 12 includes a spent acid input means 22 for delivering spent pickling acid from a pickling tank or other source into the first tank. In addition, first, spent acid receiving tank 12 includes an agitator 24 for agitating the spent acid therein, and a cooling means 26 for cooling the spent acid therein. Cooling means 26 can take various forms and be positioned either internally or externally of tank 12; however, and as will be explained more fully hereinafter, it preferably comprises a heat exchanger 27 positioned within tank 12 and coupled to the third, recovered acid storage tank 16 for circulating recovered acid from the third tank through the heat exchanger.

The second, acid recovery tank 14 also includes an agitator 34 for agitating the acid therein and a cooling means 36 for cooling the acid therein. Cooling means 36 preferably comprises a heat exchanger 37 connected to a refrigeration unit 38 such as a freon refrigeration unit, for circulating freon or another cooling medium through the heat exchanger.

The third, recovered acid storage tank 16 includes recovered acid output means 46 for delivering recovered acid to a pickling tank or other recovered acid receiving means.

Acid recovery system 10 also includes first fluid coupling means 42 for transferring acid from the first tank 12 to the second tank 14, and second fluid coupling means 44 for transferring acid from the second tank 14 to the third tank 16. Coupling means 42 and 44 preferably include suitable pumping apparatus, shown schematically at 45 and 47, respectively, for pumping acid from one tank to the other; and appropriate valve means, shown schematically at 48 and 49, respectively, for controlling the transfer of acid from one tank to the other, as will be readily understood by those skilled in the art. If desired, fluid coupling means can also comprise appropriate gravity feed apparatus for transferring acid from one tank to another.

Separator 18, which will be described in detail hereinafter, is connected to the second, acid recovery tank 14 by separator input line 52 and separator output line 54. Separator input line 52 preferably includes pumping apparatus 51 to pump acid from the second tank to the separator; and suitable valve means 50 and 53 to control the fluid flow therethrough. A valve means 73 is preferably also included in separator output line 54 to control the flow of fluid therethrough. As will be explained hereinafter, separator input and output lines 52 and 54 define a fluid circulation path whereby acid from the second tank is circulated through line 52, separator 18 and line 54 back into the second tank.

In order to provide a clear understanding of the present invention, the manner in which system 10 operates to recover spent pickling acid will now be described. Initially, spent pickling acid from a pickling tank or other source is delivered into first, spent acid receiving tank 12 via spent acid input means 22. As indicated previously, the spent acid typically comprises an aqueous sulfuric acid solution containing ferrous sulfate and other dissolved impurities; and the purpose of system 10 is to separate the dissolved impurities from the spent acid to provide a recovered acid, and to then deliver the recovered acid back to the pickling tank or to another recovered acid receiving means.

Spent acid is delivered into first tank 12 in a substantially continuous manner at a rate that can vary from less than a gallon to several hundred gallons per minute depending on the size of the system and the requirements of the pickling operation. The spent said delivered into tank 12 is at a first, elevated temperature of, for example, about 160° F., as typically required for a pickling operation.

While in the first tank 12, the spent acid is cooled by cooling means 26 to a second temperature of, for example, about 110° F. The second temperature can be varied widely but is preferably above the temperature at which any significant precipitation of the dissolved material in the acid occurs (i.e., above about 90° F.). Agitator 24 mixes and agitates the acid in the first tank to maintain the temperature of the acid in the tank at a generally uniform temperature, and to maintain any solid material that may precipitate out of the acid in suspension in the acid.

At the appropriate time, as will be explained hereinafter, a quantity of the cooled, spent pickling acid is transferred from first tank 12 to second, spent acid recovery tank 14 via first fluid coupling means 42. The quantity of acid transferred will again depend on the size and requirements of the system, but in a typical system, from 100 gallons to 30,000 gallons or more of acid can be transferred. Preferably, the first tank 12 is larger than the second tank 14 so that an adequate supply of spent acid will always be available in the first tank to be transferred to the second tank. Of course, the acid in tank 12 is continuously being replenished with spent acid via spent acid input means 22 as indicated above.

When the desired quantity of spent acid has been transferred from the first tank to the second tank, first fluid coupling means 42 is closed to stop further transfer between the tanks. The temperature of the spent acid in the second tank, which enters the tank at about 110° F., is then further reduced by cooling means 36. When the temperature of the spent acid in the second tank drops to a third temperature, about 90° F., a significant amount of ferrous sulfate begins to crystallize out of the acid. At that time, valves 53 and 73 are opened and pump means 51 is actuated to initiate a circulation period during which the acid in the second tank is circulated through separator 18 via separator input and output lines 52 and 54. As the acid circulates through the separator, the precipitated crystals are separated from the acid and retained in the separator. Circulation of the acid through separator 18 continues until the temperature of the acid in the second tank has dropped to a fourth temperature, about 32° F., at which substantially all of the dissolved ferrous sulfate will have crystallized out of the acid, and substantially all of the crystals will have been separated from the acid by the separator. Pump 51 is then shut off to discontinue circulation of the acid through the separator to conclude the circulation period.

It should be understood that the above-recited process temperatures are intended to be exemplary only of a process for recovering spent pickling acid. The exact temperatures can vary widely depending on the solubility of the particular solids in the solution being recovered by the process.

Agitator 34 is operated continuously during the circulation period to keep the acid thoroughly mixed and to prevent any significant amount of crystals from settling out of the acid within the second tank.

At the end of the circulation period, substantially all of the dissolved ferrous sulfate in the spent acid will have crystallized out of the acid and have been accumulated in separator 18. The acid in the second tank will then be recovered acid substantially free of dissolved solid material. The recovered acid in the second tank is then transferred to the third, recovered acid storage tank 16 via second fluid coupling means 44. Second tank 14 will then be empty and ready to receive a new quantity of spent pickling acid from the first tank 12 to be recovered during the next cycle of operation of the system. The circulation period typically takes 3 to 6 hours, and by the time that the recovered acid is transferred from the second tank to the third tank, there will be a sufficient quantity of spent acid in the first tank 12 to refill the second tank.

The recovered acid in the third tank 16 is retuned to the pickling tank in a continuous manner via recovered acid outlet means 46. In a typical system, recovered acid is returned to the pickling tank at an appropriate that is proportional to the rate that spent acid is withdrawn from the pickling tank via spent acid input means 22 so as to permit a pickling operation to be carried out in a continuous, uninterrupted manner.

Because the temperature of the pickling acid must be raised to about 160° F. for a pickling operation, it is desirable to raise the temperature of the recovered acid in the third tank, which is initially at about 32° F., before it is returned to the pickling tank. This is conveniently accomplished in the present invention by utilizing the cool, recovered acid in the third tank to reduce the temperature of the spent acid in the first tank 12 via the heat exchanger 27. Specifically, as shown in FIG. 1, the recovered acid in the third tank is continuously circulated through heat exchanger 27 via line 28 and such circulation is effective to raise the temperature of the recovered acid in the third tank to about 90° F. before it is returned to the pickling tank.

With the system of the present invention, when the acid in the second tank has been fully recovered, the contents of the second tank is transferred into the third tank. When the second tank is empty, a new supply of spent pickling acid is transferred from the first tank to the second tank to be recovered. The first and third tanks are preferably larger than the second tank to ensure that there is always an adequate supply of liquid in the tanks to supply the second tank and to maintain a continuous flow of recovered acid from the third tank back to the pickling tank.

FIGS. 2A and 2B schematically illustrate separator 18 in greater detail. Separator 18 comprises a generally cylindrical-shaped tank 61 which is somewhat tapered at the bottom end thereof and which defines an internal chamber 60. Tank 61 is adapted to receive acid from the second, recovery tank 14 (FIG. 1) via separator input line 52 connected to the tank adjacent the top end thereof, and to return acid to the second tank 14 via separator output line 54 adjacent the bottom end thereof. As shown in FIG. 2A, output line 54 includes an internal portion 54b which extends upwardly within chamber 60 to a position near the top end thereof, and which includes an open top end 54c. Tank 61 also has an opening 62 at its bottom end which is adapted to be normally covered by a closure member 63 which is pivotably mounted to the tank by pivot member 64.

Closure member 63 comprises a chute-like member having an upper surface 65, a portion of which is defined by a screen 66 or other perforated structure which is positioned to cover the opening 62 when the closure member is in its closed position as shown in FIG. 2A. A hollow portion or chamber 67 is formed in the closure member directly beneath screen 66, and separator outlet line 54 is connected to the chamber via an outlet branch line 54a as shown in FIG. 2A. Appropriate sealing structure is provided on the closure member 63 and/or around the bottom opening 62 of the separator tank to provide an air-tight seal when the closure member is in its closed position.

Separator 18 includes means for washing and drying the crystals which have been accumulated therein following a circulation period of the acid recovery system. Drying means 70 comprises a source 71 of air or other gas connected to the separator tank 61 by a line 72, and washing means 75 comprises a source 76 of water or other cleaning agent connected to the tank 61 by a line 77. Both the drying means 70 and the cleaning means 75 are connected to tank 61 adjacent the top end thereof as shown in FIG. 2A.

During a circulation period of system 10, closure member 63 is in its closed position shown in FIG. 2A. Acid from second, recovery tank 14 enters chamber 60 via separator input line 52. Ferrous sulfate crystals which have precipitated out of the acid separate from the acid by gravity and drop to the bottom of the tank where they gradually accumulate on the screen 66. Some of the acid may flow through screen 66 and return to second, recovery tank 14 via output branch line 54a and output line 54. In general, however, the accumulating crystals substantially cover the screen causing the acid to also accumulate in the tank. When the level of the acid in tank 61 reaches the top of internal output line portion 54b, however, it flows into outlet line portion 54b through opening 54c and returns to the second tank via line 54.

At the end of the circulation period, substantially all of the dissolved solid material in the acid will have crystallized and have been accumulated at the bottom of the separator tank 61, and recovered acid will have been circulated back to the second tank 14. Circulation of the acid through separator 18 is then stopped, and the recovered acid in the second tank 14 is transferred to the third tank 16 as indicated above.

Following a circulation period, it is desirable to remove the accumulated ferrous sulfate crystals from the separator tank prior to the next circulation period. As is known to those skilled in the art, however, the ferrous sulfate crystals are in the form of a thick crystal/acid slurry which tends to adhere to internal surfaces of the separator tank and is difficult to remove. In accordance with the present invention, removal of the crystals from the separator tank is assisted by first cleaning and drying the crystals using drying means 70 and cleaning means 75. In particular, after a circulation period is completed, valves 53 and 73 are closed, and drying means 70 is actuated to pressurize the chamber 60 in tank 61. Closure member 63 also remains in its closed position shown in FIG. 2A during pressurization. During pressurization, although valve 73 in output line 54 is closed, output branch line 54a remain open. The pressurized air is thus able to escape from the tank through output branch line 54a; and as it escapes, it travels through the crystal/acid slurry accumulated on screen 66, and forces acid from the slurry, through the screen and into lines 54a and 54 back into the second tank 14.

This process of pressurizing the tank, and causing the pressurized air to escape through the slurry in the tank can be repeated several times, if desired, until substantially all of the acid is removed from the slurry and the crystals have been substantially dried.

Following drying, the crystals can be washed, if desired, by cleaning means 75. This is accomplished by spraying water or another cleaning medium into chamber 60 from source 76 via line 77. Following a spraying operation, chamber 60 is again pressurized by drying means 70 while valves 53 and 73 are closed to drive the water or other cleaning medium out of the tank through branch line 54a and line 54 to dry the washed crystals. This washing/drying process can also be repeated several times, if desired.

After washing and drying has been completed, pivot mechanism 64 is actuated to pivot closure member 63 from its closed position shown in FIG. 2A to its open position shown in FIG. 2B. The crystals that have accumulated in chamber 60, and which have now been substantially dried, slide by gravity through outlet opening 62 and down the inclined upper surface 65 of closure member 63 into a suitable container 81. One or ore vibrator or knocker elements 82 may be mounted to the external surface of tank 61 to impact the tank and dislodge any crystals that may have adhered to the interior walls of the tank. Because the crystals have been thoroughly dried before closure member 63 is opened, however, they will flow smoothly and completely out of the tank 61. When chamber 60 is empty, closure member 63 is returned to its closed position covering opening 62 preparatory for the next cycle of operation of the system.

With the present invention, the crystals in the separator tank are substantially dried of any acid before being washed. Accordingly, only relatively small amounts of water are needed to clean the crystals. The resulting ferrous sulfate crystals are thoroughly cleaned and dried for greater ease in handling and storage and for enhanced resale value.

Separator 18 also includes means for indicating when the crystals in the separator tank have been sufficiently dried for removal from the tank. In particular, as shown in FIG. 3, line 72 connecting air source 71 to separator tank 61 is provided with a small orifice 85 therein; and pressure monitoring means such as gauges 86 and 87 are connected to the line on opposite sides of the orifice. When tank 61 is first pressurized, the pressure in line 72 will be approximately the same on both sides of orifice 85, for example, at about 12 p.s.i. When the crystal slurry in the separator tank is still thick and wet, the air in chamber 60 will escape relatively slowly and the pressure in line 72 will also drop relatively slowly and at about the same rate on both sides of orifice 85. As the drying process is repeated, however, the crystals will become drier; and the pressurized air will be able to flow through the crystals and escape from the separator chamber much more quickly. When the air escapes from chamber 60 more rapidly, the pressure in line 72 on the tank side of orifice 85 (as monitored by gauge 87) will drop more rapidly than the pressure in the line on the source side of the orifice (as monitored by gauge 86); and, the resulting pressure differential is an indication of the extent to which the crystals have been dried. When the pressure differential reaches a predetermined level, for example, about 9 p.s.i. (when gauge 87 reads 3 p.s.i., and gauge 86 still reads about 12 p.s.i.), the crystals have been substantially completely dried and the drying process is completed.

System 10 is adapted to operate in a substantially automatic manner with minimum operator involvement by a microprocessor control 90 as illustrated in FIG. 1. The microprocessor monitors the temperature of the acid in the various tanks and controls the operation of the various valves and pumps in the system to control the transfer of liquid through the system, the agitators 24 and 34, and the drying and cleaning means 70 and 75. Microprocessor 90 also monitors gauges 86 and 87 to automatically operate closure member 63 to dispense crystals from the separator after they have been washed and dried.

While what has been described constitutes a presently most preferred embodiment of the invention, it should be recognized that the invention can take numerous other forms. For example, separator 18, although described herein as a component of the liquid recovery system of the present invention, is not limited to use in such system but can be readily adapted for use in many applications wherein it is desired to separate solid material from a liquid medium. Because the invention can be varied in many ways, it should be understood that the invention is to be limited only insofar as is required by the scope of the following claims.

I claim:

1. A separator for separating solid material suspended in a liquid, said separator including means for removing liquid from a slurry sufficient to enable gravity discharge thereof, further including;

means for defining an enclosed chamber, said chamber having a liquid inlet for inputting a liquid thereinto and a liquid outlet for outputting a liquid therefrom;

perforated means adjacent said liquid outlet for permitting a liquid to flow therethrough while preventing suspended solid material therein from flowing therethrough whereby separated solid material is accumulated in said chamber; and means for drying said accumulated solid material in said chamber, said drying means including means for pressurizing said chamber for causing pressurized gas to escape through said accumulated solid material, through said perforated means and through said liquid outlet to drive liquid off of said accumulated solid material and out of said chamber through said liquid outlet.

2. The separator of claim 1 wherein said pressurizing means comprises a source of pressurized gas, and a line connecting said source to said chamber, said line having an orifice therein, and pressure monitoring means for monitoring the pressure in said line on opposite sides of said orifice for monitoring the extent to which said accumulated solid material has been dried.

3. The separator of claim 1 and further including means for cleaning said accumulated solid material, said cleaning means including means for spraying a cleaning agent over said accumulated solid material in said chamber.

4. The separator of claim 1 and further including an outlet opening adjacent the bottom end of said chamber, and a closure member movable between a first position covering said outlet opening in a substantially air-tight manner and a second position uncovering said outlet opening to permit dried accumulated solid material to be dispensed ;from said chamber through said outlet opening by gravity.

* * * * *

UNITED STATES PATENT AND TRADEMARK OFFICE
CERTIFICATE OF CORRECTION

PATENT NO. : 5,037,545

DATED : August 6, 1991

INVENTOR(S) : Richard D. Billmyre

It is certified that error appears in the above-identified patent and that said Letters Patent is hereby corrected as shown below:

In col. 5, line 31, change "said" to --acid--.
In col. 6, line 42, change "retuned" to --returned--.
In col. 6, line 45, after "appropriate", insert --rate--.
In col. 8, line 19, change "remain" to --remains--.
In col. 8, line 47, change "ore" to --more--.
In col. 10, line 44 (claim 4, line 7), after "dispensed,", delete --;-- (semi-colon).

Signed and Sealed this

Twenty-second Day of December, 1992

*Attest:*

DOUGLAS B. COMER

*Attesting Officer*     *Acting Commissioner of Patents and Trademarks*